United States Patent
Liang

(10) Patent No.: US 8,103,160 B2
(45) Date of Patent: Jan. 24, 2012

(54) PORTABLE ELECTRONIC DEVICE WITH CAMERA ASSEMBLY

(75) Inventor: Shi-Xu Liang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 27 days.

(21) Appl. No.: 12/859,163

(22) Filed: Aug. 18, 2010

(65) Prior Publication Data

US 2011/0229119 A1 Sep. 22, 2011

(30) Foreign Application Priority Data

Mar. 22, 2010 (CN) .......................... 2010 1 0130087

(51) Int. Cl.
*G03B 17/02* (2006.01)

(52) U.S. Cl. ...................................................... 396/535
(58) Field of Classification Search ................... 396/535
See application file for complete search history.

(56) References Cited

U.S. PATENT DOCUMENTS

| | | | |
|---|---|---|---|
| 2004/0001157 A1* | 1/2004 | Chan et al. | 348/335 |
| 2006/0133798 A1* | 6/2006 | Palmer et al. | 396/427 |
| 2011/0058088 A1* | 3/2011 | Hsu et al. | 348/335 |

* cited by examiner

*Primary Examiner* — Clayton E Laballe
*Assistant Examiner* — Dennis Hancock
(74) *Attorney, Agent, or Firm* — Altis Law Group, Inc.

(57) ABSTRACT

An exemplary portable electronic device includes a housing, a camera assembly, and a deformable protective member. The camera assembly includes a circuit board and a camera unit. The protective member defines a through cavity. The through cavity receives the camera unit. The housing resists against and deforms the protective member and the circuit board resists against the protective member, sealing the through cavity.

12 Claims, 4 Drawing Sheets

PORTABLE ELECTRONIC DEVICE WITH CAMERA ASSEMBLY

BACKGROUND

1. Technical Field

The present disclosure relates to a portable electronic device with a camera assembly.

2. Description of the Related Art

Portable electronic devices such as mobile phones usually include camera assemblies for capturing images. Typically, anti-dust cotton is used to fill and seal gaps to prevent dust from entering through the gaps into the camera assembly. However, the assembly of the anti-dust cotton is very difficult with the increasingly compact camera assemblies available today.

Therefore, there is room for improvement within the art.

BRIEF DESCRIPTION OF THE DRAWINGS

Many aspects of the present portable electronic device with a camera assembly can be better understood with reference to the following drawings. The components in the drawings are not necessarily drawn to scale, the emphasis instead being placed upon clearly illustrating the principles of the present portable electronic device with the camera assembly. Moreover, in the drawings, like reference numerals designate corresponding parts throughout the several views.

DETAILED DESCRIPTION

Figure 1:
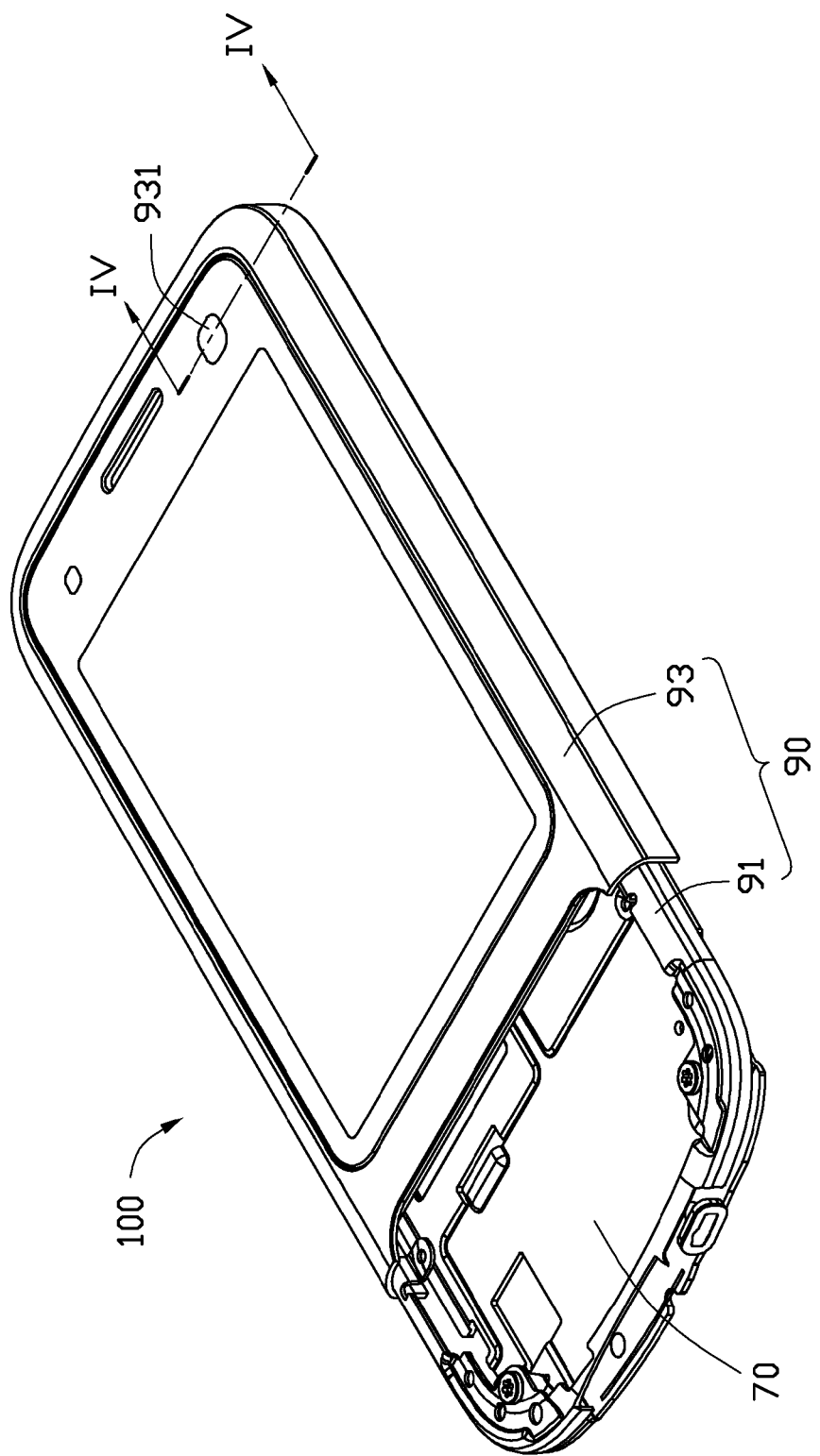
FIG. 1 is an assembled isometric view of a portable electronic device including a housing according to an exemplary embodiment.
Figure 2:
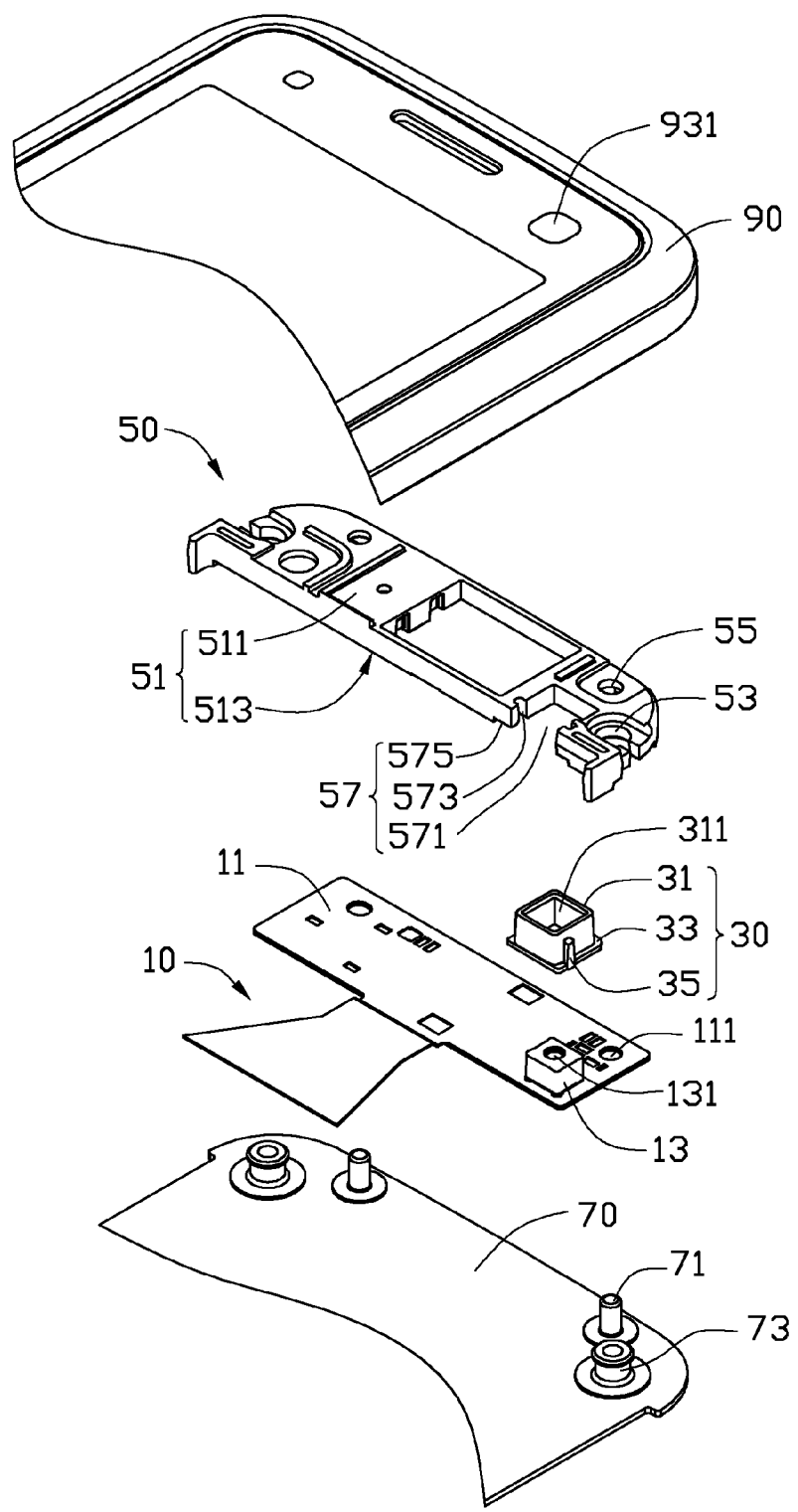
FIG. 2 is an exploded view of the portable electronic device shown in FIG. 1.

FIG. 1 and FIG. 2 show an exemplary embodiment of a portable electronic device 100 including a camera assembly 10, a protective member 30, a securing member 50, a supporting member 70, and a housing 90. The supporting member 70 supports the camera assembly 10, the protective member 30, and the securing member 50. The housing 90 encloses the supporting member 70, the camera assembly 10, the protective member 30, and the securing member 50.

The camera assembly 10 includes a circuit board 11 and a camera unit 13 mechanically and electronically mounted on the circuit board 11. The circuit board 11 defines two fixing holes 111. The camera unit 13 is secured to an end of the circuit board 11. The camera unit 13 defines an aperture 131 at the top. During capturing of an image by the camera unit 13, light can pass through the aperture 131 into the camera unit 13.

The protective member 30 is deformable and includes a sleeve 31, a base frame 33, and two latching rods 35. The sleeve 31 is hollow with a through cavity 311. The through cavity 311 is defined through the center of the sleeve 31, and has substantially the same shape and size as the of the camera unit 13. The camera unit 13 engages in the through cavity 311. The base frame 33 extends from an end of the sleeve 31 and surrounds the through cavity 311. The two latching rods 35 protrude from the exterior surface of the sleeve 31 and are connected to the base frame 33. The latching rods 35 are for latching the protective member 30 to the securing member 50.

The securing member 50 includes a securing body 51, two securing holes 53 through the securing body 51, two receiving holes 55, and a securing section 57. The securing body 51 includes an upper wall 511 and a bottom wall 513 opposite to the upper wall 511. The securing holes 53 are defined through two opposite ends of the securing body 51 for securing the securing member 50 to the supporting member 70. The receiving holes 55 are defined through the securing body 51 near the securing holes 53, respectively. The securing section 57 is defined near one of the receiving holes 55 and the corresponding securing hole 53. The securing section 57 includes a mounting groove 571, two latching slots 573, and a receiving slit 575. The mounting groove 571, the latching slots 573 and the receiving slit 575 communicate with each other. The mounting groove 571 is for mounting the camera unit 13 therein. The latching slots 573 correspond to and latch the latching rods 35 therein. The latching slots 573 are positioned at two sides of the mounting groove 571. The receiving slit 575 is positioned below the mounting groove 571 for receiving the base frame 33 therein.

The supporting member 70 has two fixing posts 71 and two securing posts 73 protruding therefrom corresponding to the fixing holes 111 and the securing holes 53, respectively. The fixing posts 71 can be fixed in the fixing holes 111 and received in the receiving holes 55. The two securing posts 73 can be secured in the securing holes 53.

Figure 4:
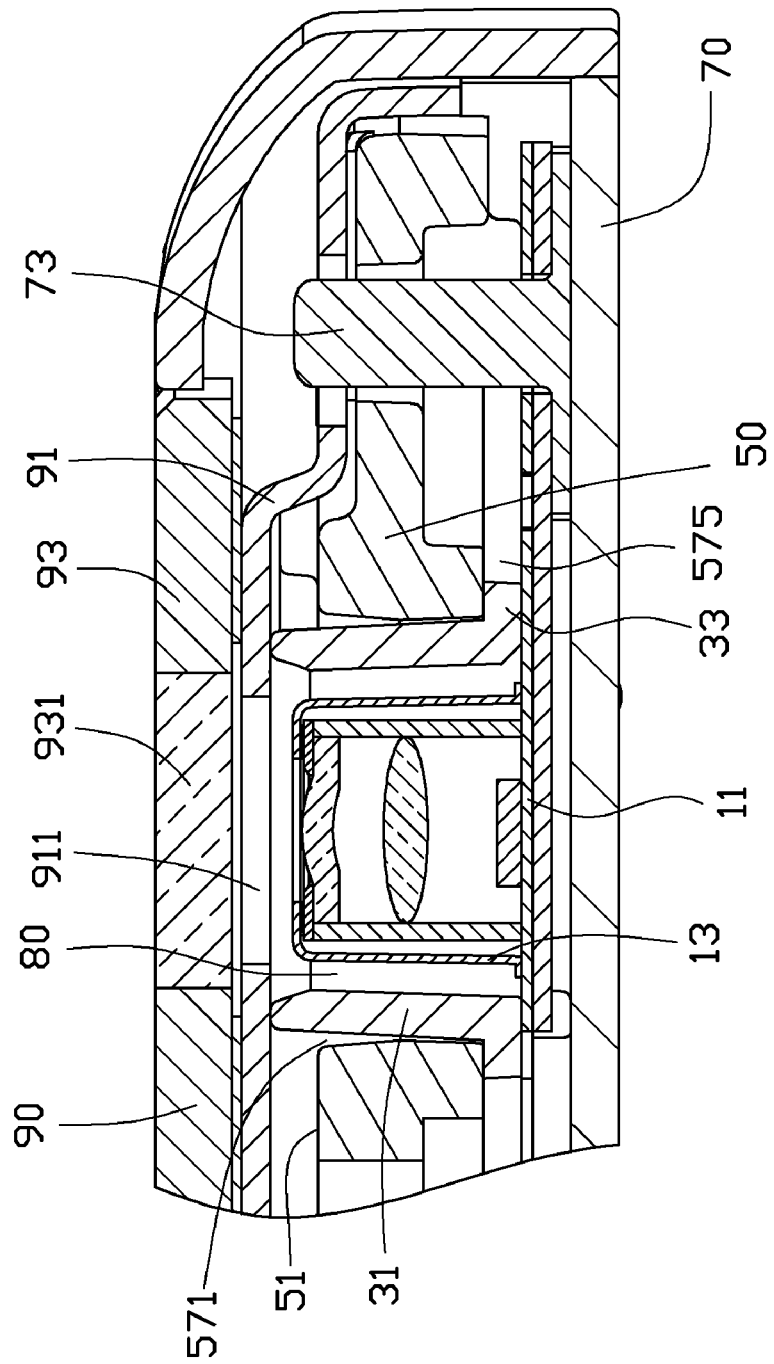
FIG. 4 is a cross sectional view of the portable electronic device shown in FIG. 1, taken along line IV-IV of FIG. 1.

Referring further to FIG. 4, the housing 90 includes a housing frame 91 and a housing body 93 fixed to the housing frame 91. The housing body 93 defines a camera hole 911 corresponding to the camera unit 13. The housing body 93 further has a lens 931 positioned above the camera hole 911.

Figure 3:
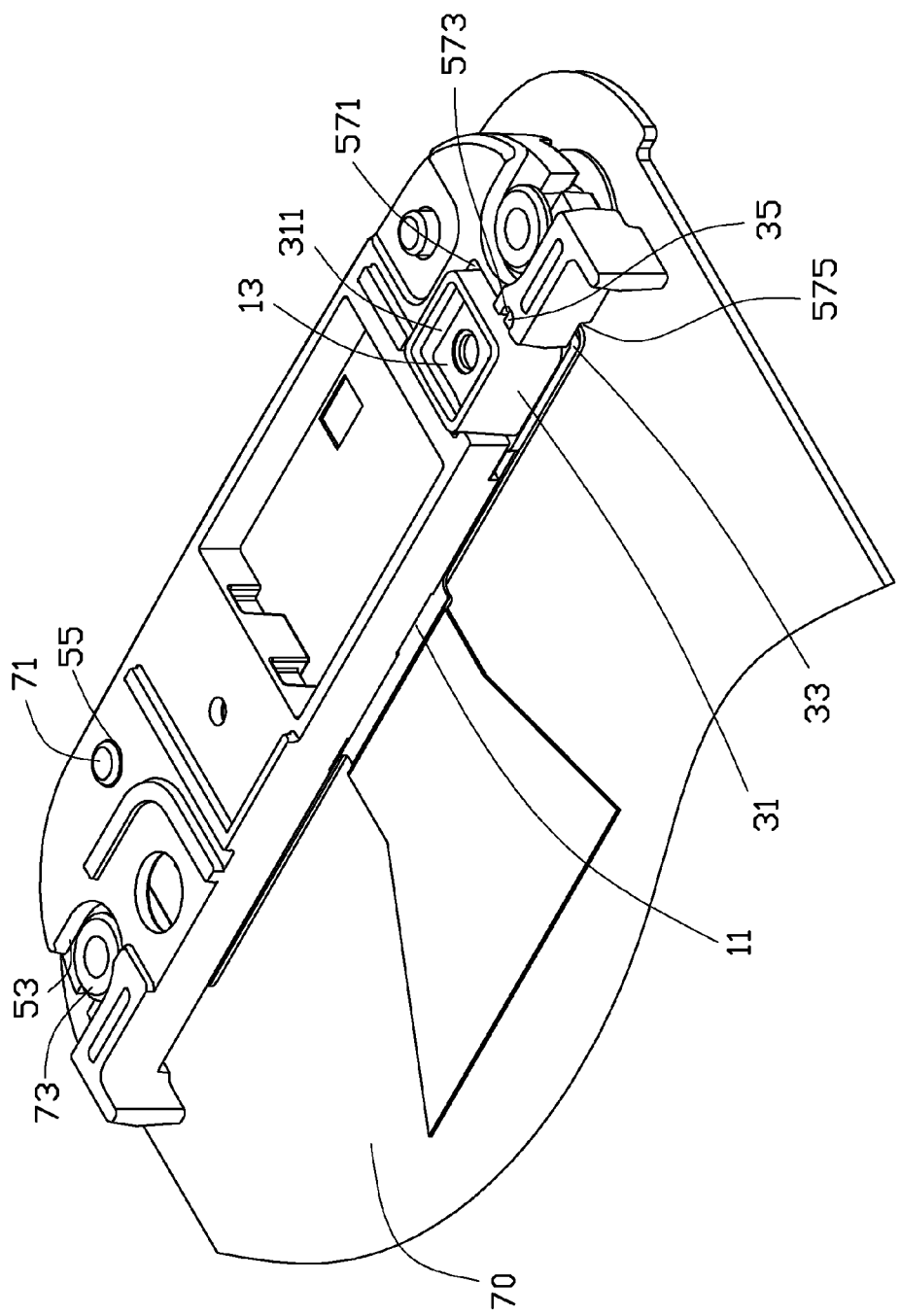
FIG. 3 is a partial view of the portable electronic device shown in FIG. 1 without the housing.

Referring further to FIG. 3, in assembly of the portable electronic device 100, the camera assembly 10 is mounted on the supporting member 70. The supporting member 70 supports the protective member 30 and the securing member 50. The circuit board 11 can be adhered to the supporting member 70. The two latching rods 35 latch in the latching slots 573, latching the protective member 30 in the securing section 57. The sleeve 31 is received in the mounting groove 571, and partially exposed out of the mounting groove 571 above the upper wall 511. Each fixing post 71 extends through the corresponding fixing hole 111 and then on through the corresponding receiving hole 55. The camera unit 13 is received in the through cavity 311. The securing posts 73 are secured in the securing holes 53. The base frame 33 is received in the receiving slit 575 and positioned between the supporting member 70 and the bottom wall 513.

The supporting member 70, the camera assembly 10, the protective member 30, the circuit board 11, and the securing member 50 are received in the housing 90 with the camera hole 911, the aperture 131, and the lens 931 aligned with each other. The housing frame 91 resists against and deforms the sleeve 31 and the circuit board 11 resists against the base frame 33, eliminating gaps between the housing 90, the circuit board 11, and the sleeve 31, accordingly, sealing the through cavity 311 and effectively preventing contaminants from contaminating the camera unit 13 inside the through cavity 311.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A portable electronic device, comprising:
   a housing;
   a camera assembly comprising a circuit board and a camera unit mechanically and electronically connected to the circuit board; and
   a deformable protective member comprising a sleeve and a base frame connecting the end of the sleeve, the sleeve defining a through cavity, the through cavity receiving the camera unit, the deformable protective member positioned between the housing and the circuit board so the housing resists against and deforms the protective member and the circuit board resists against the protective member, sealing the through cavity;
   a securing member secured on the circuit board, the securing member securing the protective member between the housing and the circuit board, the securing member comprising a securing section, the securing section comprising a mounting groove and a receiving slit, the base frame received in the receiving slit, the sleeve latched in the mounting groove; and
   a supporting member, the protective member secured in securing section, the securing member secured to the supporting member, the supporting member supporting the securing member, the camera assembly, and the protective member.

2. The portable electronic device as claimed in claim 1, wherein the sleeve is partially exposed out of the mounting groove.

3. The portable electronic device as claimed in claim 1, wherein the protective member further comprises latching rods, the securing section further comprises latching slots, the latching rods latched in the latching slots.

4. The portable electronic device as claimed in claim 1, wherein the housing comprises a housing frame and a housing body connected to the housing frame, the housing frame resisting against and deforming the portion of the sleeve exposed out of the mounting groove, the circuit board resisting against the base frame.

5. The portable electronic device as claimed in claim 1, wherein the circuit board comprises fixing holes, the supporting member comprises fixing posts, the fixing posts fixed in the fixing holes.

6. The portable electronic device as claimed in claim 5, wherein the supporting member further comprises securing posts, the securing member defines securing holes, the securing posts secured in the securing holes.

7. A portable electronic device, comprising:
   a housing;
   a camera assembly received in the housing, the camera assembly comprising a circuit board and a camera unit connected to the circuit board;
   a supporting member received in the housing;
   a securing member received in the housing and comprising a securing section, the securing section comprising a mounting groove and a receiving slit; and
   a protective member received in the housing and secured in the securing section, the securing member secured the protective member between the housing and the circuit board, the supporting member supporting and securing the securing member, the camera assembly, and the protective member, the protective member comprising a sleeve and a base frame connecting the end of the sleeve, the base frame received in the receiving slit, the sleeve latched in the mounting groove and defining a through cavity receiving the camera unit and being resisted against by the housing and the circuit board to seal the camera unit inside the through cavity.

8. The portable electronic device as claimed in claim 7, wherein the sleeve is partially exposed out of the mounting groove.

9. The portable electronic device as claimed in claim 7, wherein the protective member further comprises latching rods, the securing section further comprises latching slots, the latching rods latched in the latching slots.

10. The portable electronic device as claimed in claim 7, wherein the housing comprises a housing frame and a housing body connected to the housing frame, the housing frame resisting against and deforming the portion of the sleeve exposed out of the mounting groove, the circuit board resisting against the base frame.

11. The portable electronic device as claimed in claim 7, wherein the circuit board comprises fixing holes, the supporting member comprises fixing posts, the fixing posts fixed in the fixing holes.

12. The portable electronic device as claimed in claim 11, wherein the supporting member further comprises securing posts, the securing member defines securing holes, the securing posts secured in the securing holes.

* * * * *